US011645369B2

(12) United States Patent
Wojcik

(10) Patent No.: US 11,645,369 B2
(45) Date of Patent: May 9, 2023

(54) BLOCKCHAIN DIGITAL RIGHTS MANAGEMENT STREAMING LIBRARY

(71) Applicant: INTERNATIONAL BUSINESS MACHINES CORPORATION, Armonk, NY (US)

(72) Inventor: Marci Ramona Wojcik, Grand Blanc, MI (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 16/743,548

(22) Filed: Jan. 15, 2020

(65) Prior Publication Data
US 2021/0216612 A1   Jul. 15, 2021

(51) Int. Cl.
G06F 21/16 (2013.01)
H04L 9/40 (2022.01)
H04L 9/00 (2022.01)

(52) U.S. Cl.
CPC ............. *G06F 21/16* (2013.01); *H04L 9/50* (2022.05); *H04L 63/0853* (2013.01); *G06F 2221/0733* (2013.01); *H04L 2209/608* (2013.01)

(58) Field of Classification Search
CPC ... G06F 21/10; G06F 21/16; H04L 2209/608; H04L 2209/38; H04L 63/0853
See application file for complete search history.

(56) References Cited

U.S. PATENT DOCUMENTS

| 7,240,196 | B2 * | 7/2007 | Cooper | G06F 21/10 |
| | | | | 705/51 |
| 7,489,797 | B2 | 2/2009 | Izquierdo | |
| 10,341,121 | B2 | 7/2019 | Androulaki et al. | |
| 10,592,639 | B2 * | 3/2020 | Gaidar | G06F 21/10 |
| 10,691,830 | B2 * | 6/2020 | Munro | G06F 16/951 |
| 10,885,159 | B2 * | 1/2021 | Smaiely | G06Q 20/1235 |
| 11,080,368 | B2 * | 8/2021 | Chen | H04L 9/0643 |
| 11,120,117 | B2 * | 9/2021 | Chacko | G06F 21/606 |
| 2002/0188841 | A1 * | 12/2002 | Jones | G06K 9/00442 |
| | | | | 713/153 |
| 2003/0182236 | A1 | 9/2003 | Tanaka et al. | |
| 2005/0144019 | A1 | 6/2005 | Murakami et al. | |
| 2017/0195332 | A1 * | 7/2017 | Wu | G06Q 10/06 |

(Continued)

OTHER PUBLICATIONS

Mell et al., "The NIST Definition of Cloud Computing", National Institute of standards and technology, Sep. 2011, 7 pages.

(Continued)

*Primary Examiner* — Linglan Edwards
(74) *Attorney, Agent, or Firm* — Rakesh Roy; Andrew D. Wright; Calderon Safran & Cole, P.C.

(57) ABSTRACT

A computer-implemented method includes: receiving, by a computer device, an artifact and a first token with a check-in request; applying, by the computer device, a first level fragile watermark to the artifact, wherein the first level fragile watermark includes ownership information from the first token; receiving, by the computer device, a second token with a check-out request; applying, by the computer device, a second level fragile watermark to a copy of the first level fragile watermarked artifact, wherein the second level fragile watermark includes authentication information from the second token; and transmitting, by the computer device, the second level fragile watermarked copy of the artifact to a client device.

19 Claims, 13 Drawing Sheets

(56) References Cited

U.S. PATENT DOCUMENTS

| | | | | |
|---|---|---|---|---|
| 2018/0068091 | A1* | 3/2018 | Gaidar | G06F 21/16 |
| 2018/0276626 | A1* | 9/2018 | Laiben | G06Q 20/02 |
| 2019/0012439 | A1* | 1/2019 | Munro | H04L 9/0869 |
| 2019/0087792 | A1 | 3/2019 | Chow et al. | |
| 2019/0190896 | A1 | 6/2019 | Singh | |
| 2019/0362389 | A1* | 11/2019 | Turner | G06Q 20/0655 |

OTHER PUBLICATIONS

Tiwari et al. "Digital Watermarking Encryption and Decryption Using DWT", International Research Journal of Engineering and Technology (IRJET), vol. 02 Issue: 02, May 2015, 6 pages.

Anonymous, "Smart Contracts and Chaincode",https://hyperledger-fabric.readthedocs.io/en/release-1.4/smartcontract/smartcontract.html, Oct. 2019, 9 pages.

Anonymous, "Smart Contract Processing",https://hyperledger-fabric.readthedocs.io/en/release-1.4/developapps/smartcontract.html, Oct. 2019, 12 pages.

Rakhmawati et al. ,"A recent survey of self-embedding fragile watermarking scheme for image authentication with recovery capability", EURASIP Journal on Image and Video Processing, 2019, 22 pages.

Anonymous, "Introduction to JSON Web Tokens", Oct. 2019, 11 pages.

Anonymous, "JSON Web Token", Wikipedia, Dec. 28, 2010, 6 pages.

Jones et al., Internet Engineering Task Force (IETF), ISSN: 2070-1721, May 2015, 12 pages.

Anonymous, "The Hyperledger Fabric SDK", https://fabric-sdk-node.github.io/release-1.4/index.html, Oct. 2019, 3 pages.

Yu et al., "Review on Semi-Fragile Watermarking Algorithms for Content Authentication of Digital Images", School of Mechanical, Electrical and Information Engineering, Shandong University, Weihai 264209, China, Sep. 25, 2017, 17 pages.

Zhang et al., "Fragile Watermarking for Image Authentication Using the Characteristic of SVD", School of Mechanical, Electrical and Information Engineering, Shandong University, Weihai 264209, China, Feb. 2017, 12 pages.

Anonymous, "Architecture Origins",https://hyperledger-fabric.readthedocs.io/en/latest/arch-deep-dive.html#swimlane, Oct. 2019, 18 pages.

Caragata et al., "An improved fragile watermarking algorithm for JPEG images", vol. 69, Issue 12, Dec. 2015, 2 pages.

Harttraft et al., "Where Does Blockchain Fit in Digital Rights Management?",https://www.ipwatchdog.com/2018/02/06/blockchain-fit-digital-rights, Feb. 6, 2018, 4 pages.

Brechter, "Using Blockchain For Media Rights Management And Ad Revenues", https://www.digitalistmag.com/digital-economy/2017/12/19/using, Dec. 19, 2017, 8 pages.

Scoblete, "Kodak Enters the Blockchain Market With Image Licensing Service and Its Own Crypto Currency", Jan. 9, 2018, 6 pages.

Zhao, "BMCProtector: A Blockchain and Smart Contract Based Application for Music Copyright Protection", Proceedings of the 2018 International Conference on Blockchain Technology and Application (ICBTA 2018). ACM, New York, NY, https://doi.org/10.1145/3301403.3301404, Dec. 10, 2018, 5 pages.

Rosenblatt, "Dot Blockchain Media Makes Blockchain Plus Watermarking a Reality", https://copyrightandtechnology.com/2018/01/24/dot-blockchain-media-makes-blockchain-plus-watermarking-a-reality/, Copyright and Technology, Jan. 24, 2018, 6 pages.

Anonymous, "Gossip data dissemination protocol", https://hyperledger-fabric.readthedocs.io/en/release-1.4/gossip.html. Hyperledger, accessed Jan. 14, 2020, 5 pages.

Anonymous, "Blockchain network", https://hyperledger-fabric.readthedocs.io/en/release-1.4/network/network.html, Hyperledger, accessed Jan. 14, 2020, 26 pages.

Anonymous, "Structure", https://hyperledger-fabric.readthedocs.io/en/release-1.4/developapps/transactioncontext.html#structure, accessed Apr. 20, 2022, 1 page.

Anonymous, "Ledger", https://hyperledger-fabric.readthedocs.io/en/release-1.4/ledger/ledger.html, accessed Apr. 20, 2022, 11 pages.

Anonymous, "Access Control Lists (ACL)", https://hyperledger-fabric.readthedocs.io/en/release-1.4/access_control.html#policies, accessed Apr. 20, 2022, 7 pages.

Anonymous, "Pluggable transaction endorsement and validation", https://hyperledger-fabric.readthedocs.io/en/release-1.4/pluggable_endorsement_and_validation.html, accessed Apr. 20, 2022, 5 pages.

Anonymous, "Chaincode namespace", https://hyperledger-fabric.readthedocs.io/en/release-1.4/developapps/chaincodenamespace.html, accessed Apr. 20, 2022, 7 pages.

* cited by examiner

US 11,645,369 B2

BLOCKCHAIN DIGITAL RIGHTS MANAGEMENT STREAMING LIBRARY

BACKGROUND

Aspects of the present invention relate generally to digital rights management and, more particularly, to a blockchain digital rights management streaming library.

Digital rights management (DRM) tools or technological protection measures (TPM) are a set of access control technologies for restricting the use of proprietary hardware and copyrighted works. DRM technologies try to control the use, modification, and distribution of copyrighted works (such as software and multimedia content), as well as systems within devices that enforce these policies.

SUMMARY

In a first aspect of the invention, there is a computer-implemented method including: receiving, by a computer device, an artifact and a first token with a check-in request; applying, by the computer device, a first level fragile watermark to the artifact, wherein the first level fragile watermark includes ownership information from the first token; receiving, by the computer device, a second token with a check-out request; applying, by the computer device, a second level fragile watermark to a copy of the first level fragile watermarked artifact, wherein the second level fragile watermark includes authentication information from the second token; and transmitting, by the computer device, the second level fragile watermarked copy of the artifact to a client device.

In another aspect of the invention, there is a computer program product, the computer program product comprising one or more computer readable storage media having program instructions collectively stored on the one or more computer readable storage media, the program instructions executable to: receive an artifact and a first token with a check-in request, wherein the artifact is digital media; apply a first level fragile watermark to the artifact, wherein the first level fragile watermark includes ownership information from the first token, and the first level fragile watermark is imperceptible to a human user viewing the digital media; receive a second token with a check-out request; apply a second level fragile watermark to a copy of the first level fragile watermarked artifact, wherein the second level fragile watermark includes authentication information from the second token; and transmit the second level fragile watermarked copy of the artifact to a client device, wherein the first level fragile watermarked artifact remains in storage in a digital rights management blockchain network while the second level fragile watermarked copy of the artifact is transmitted to the client device.

In another aspect of the invention, there is a system comprising one or more computer readable storage media, and program instructions collectively stored on the one or more computer readable storage media, the program instructions comprising: program instructions to receive an artifact and a first token with a check-in request, wherein the artifact is digital media; program instructions to apply a first level fragile watermark to the artifact, wherein the first level fragile watermark includes ownership information from the first token, and the first level fragile watermark is imperceptible to a human user viewing the digital media; program instructions to receive a second token with a check-out request; program instructions to apply a second level fragile watermark to a copy of the first level fragile watermarked artifact, wherein the second level fragile watermark includes authentication information from the second token; and program instructions to transmit the second level fragile watermarked copy of the artifact to a client device, wherein the first level fragile watermarked artifact remains in storage in a digital rights management blockchain network while the second level fragile watermarked copy of the artifact is transmitted to the client device.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
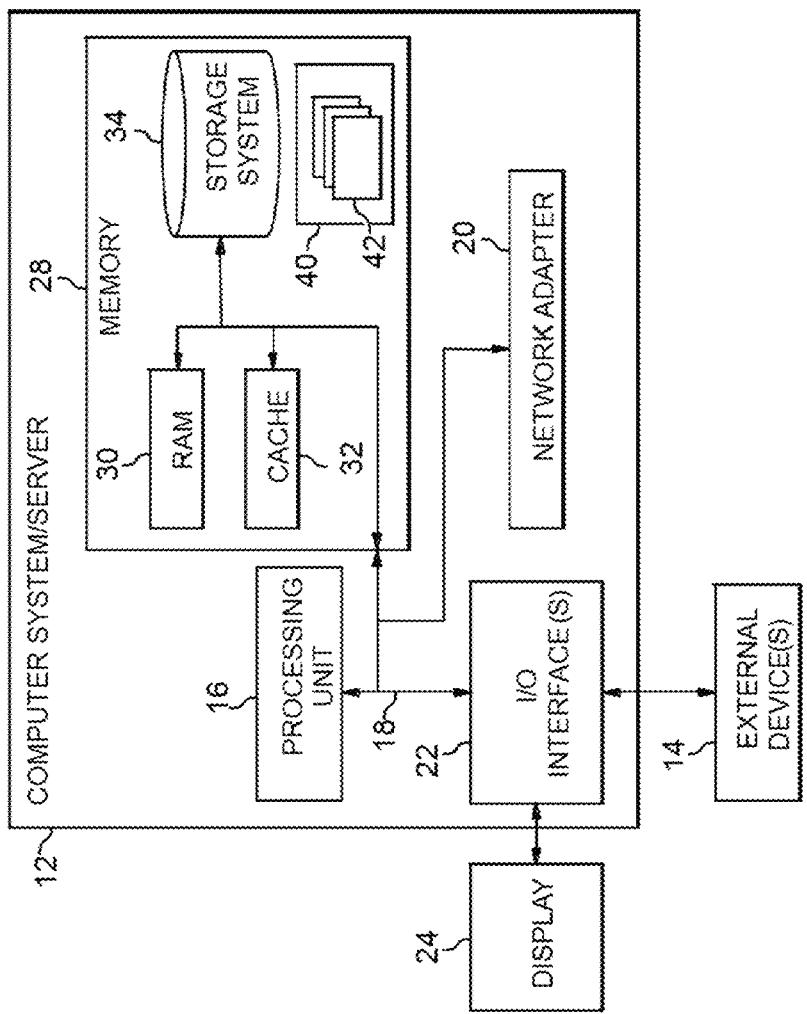
FIG. 1 depicts a cloud computing node according to an embodiment of the present invention.

Aspects of the present invention relate generally to digital rights management and, more particularly, to a blockchain digital rights management streaming library. Embodiments of the invention apply fragile watermarks to copies of digital media that are licensed for consumption by an end user. According to aspects of the invention, the fragile watermark applied to a copy of digital media contains provenance information about one or more of: ownership of the rights in the digital media; and authorization to access (e.g., view) the copy of the digital media. In this manner, provenance information about a copy of digital media is contained within the copy of the digital media itself, as opposed to being contained in a document or wrapper that can be separated from the copy of the digital media. In embodiments, an end user attempting to view the copy of the digital media must present a valid credential that satisfies the fragile watermark that is included in the copy of the digital media. If the credential does not satisfy the fragile watermark, then the end user cannot view the copy of the digital media. In this manner, implementations of the invention provide a digital rights management tool that can be used to enforce access controls to copies of digital media.

Current crowdsourcing of digital media found on the Internet provides access to non-copyrighted data (e.g., images, documents, data files, etc.) as well as copyrighted data. Digital watermarking can be applied to each artifact of digital media to try and enforce copyright and ownership protection to the data. Persons wishing to use watermarked protected artifacts are provided the opportunity to unlock the digital media for a license fee for use. Once the unlocking happens, the watermarked digital media is typically open and accessible until the license expires, at which point the digital media shows its watermark again and becomes essentially unusable. During the time the digital media is opened, it can be reproduced into non-watermarked file containers or image snapshots. There are many ways to defeat the watermark as well, removing it entirely from the file or digital media content. The digital rights of the digital media are therefore not preserved and owner rights are lost in this scenario.

Aspects of the invention define a blockchain-based digital rights management streaming library (DRMSL) for online media and artifacts. As used herein, "artifact" refers to an object of digital media, with "digital media" referring to digitized content (e.g., text, graphics, audio, and video) that can be stored in computer storage and transmitted over computer networks such as the Internet. Examples of artifacts, as the term is used herein, include but are not limited to digital pictures (e.g., files with extensions such as JPEG, PNG, TIFF, and GIF), digital movies (e.g., files with extensions such as AVI, FLV, WMV, MP4, and MOV), digital audio (e.g., files with extensions such as WAV, AIFF, AU, and MP3), and documents (e.g., files with extensions such as PDF).

In some embodiments, artifacts are uploaded to a blockchain, where they are encrypted, compressed, watermarked or otherwise internally tagged with a trademark or other owner signs and markings during the artifact registration process. A feature of the DRMSL is the check-out and check-in access process that guarantees the original digital content is not altered. In implementations, the artifacts can also be versioned, where the ownership is enforced and tracked through revisions. Vendors can create indexing, browsing and catalog commercial features to license access to the protected artifact library.

As described herein, the blockchain-based DRMSL enforces trademarks, watermarks and other ownership signs and markings for registered artifacts. In embodiments, the DRMSL provides artifact registration, check-in, check-out, browsing and catalog commercial features. Artifacts may be indexed and revisioned. In aspects, a cloud based application program interface (API) provides vendor access to develop library provider use cases for artifact licensing and management. In implementations, users who properly license the artifact then receive a fragile watermarked version of the original artifact which streams to their devices, and the fragile watermark ensures the access to the artifact upholds the licensed agreement.

In one exemplary implementation, there is a method that includes a step of registering with the DRMSL to obtain an initial identifying encryption key and passcode. The method includes checking-in artifacts using a client application that requests either the default encryption key and passcode, profile, or customized information. The method also includes the DRMSL domain storing the original checked-in artifact(s) and generating a fragile watermark based on a user's own identifying criteria. In this step the user receives an encryption key and passcode that they may license access to or share. The DRMSL can be browsed by authorized users, who can check-out artifacts from the DRMSL by providing the correct encryption key and passcode. As part of the check-out, a copy of the artifact streams to authorized devices with the fragile watermark deeply embedded into the copy of the artifact. If a device attempts to access the copy of the artifact without the required encryption key and passcode, the fragile watermark will obfuscate the copy of the artifact, thus destroying the content.

In this manner, implementations of the invention provide a method for managing digital rights using a blockchain, the method comprising: in response to receiving, from a first user, a digital asset for storage in a blockchain: (i) applying a fragile watermark to the digital asset, (ii) storing the watermarked digital asset in the blockchain, and (iii) providing, to the first user, an encryption key and passcode for streaming the digital asset; and in response to receiving, from a second user, a request to stream the digital asset: (i) authenticating the second user using the encryption key and passcode, (ii) creating a copy of the watermarked digital asset from watermarked digital asset stored in the blockchain, and (iii) streaming the copy of the watermarked digital asset to the second user; wherein if the copy of the watermarked digital asset is accessed without the encryption key and passcode, the fragile watermark obfuscates the copy, rendering the copy unusable.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
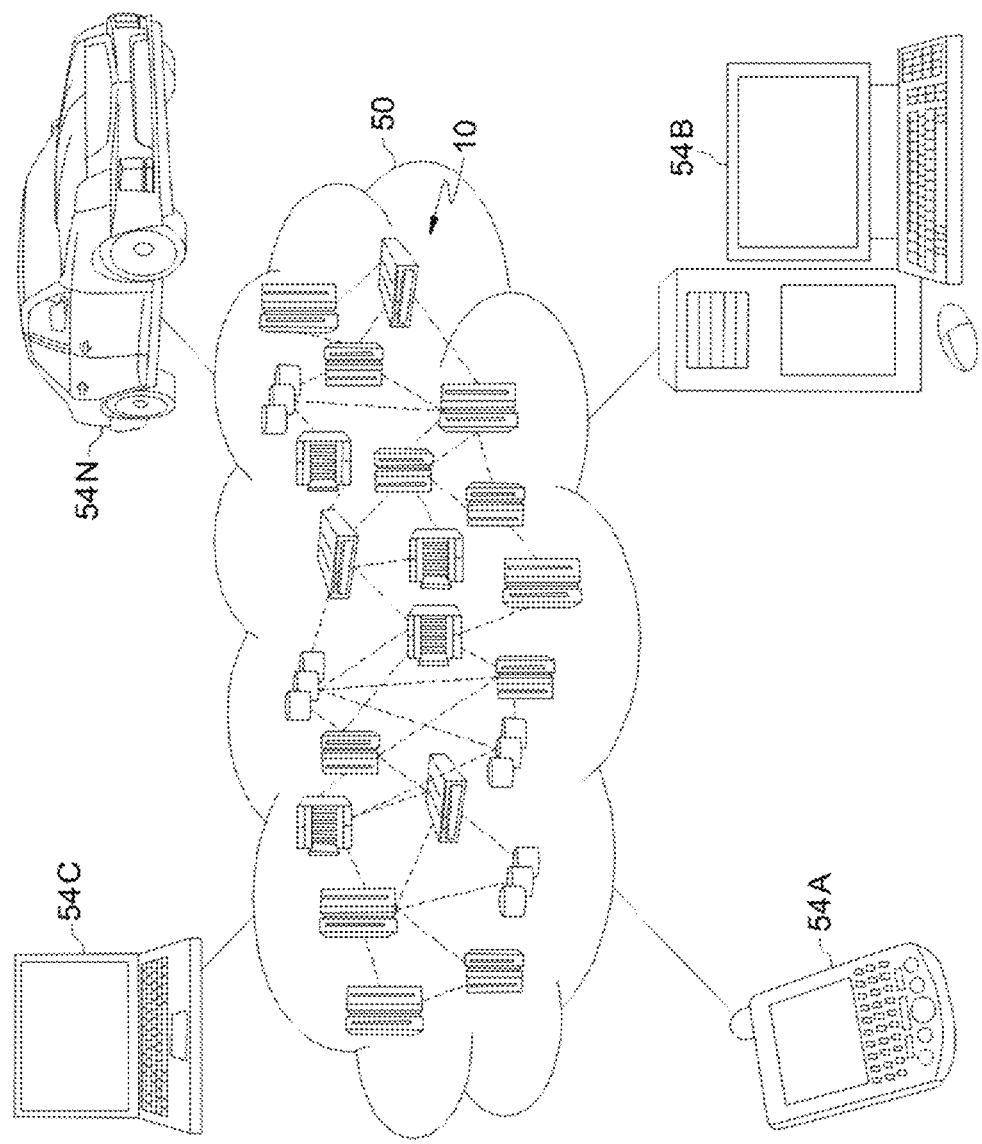
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
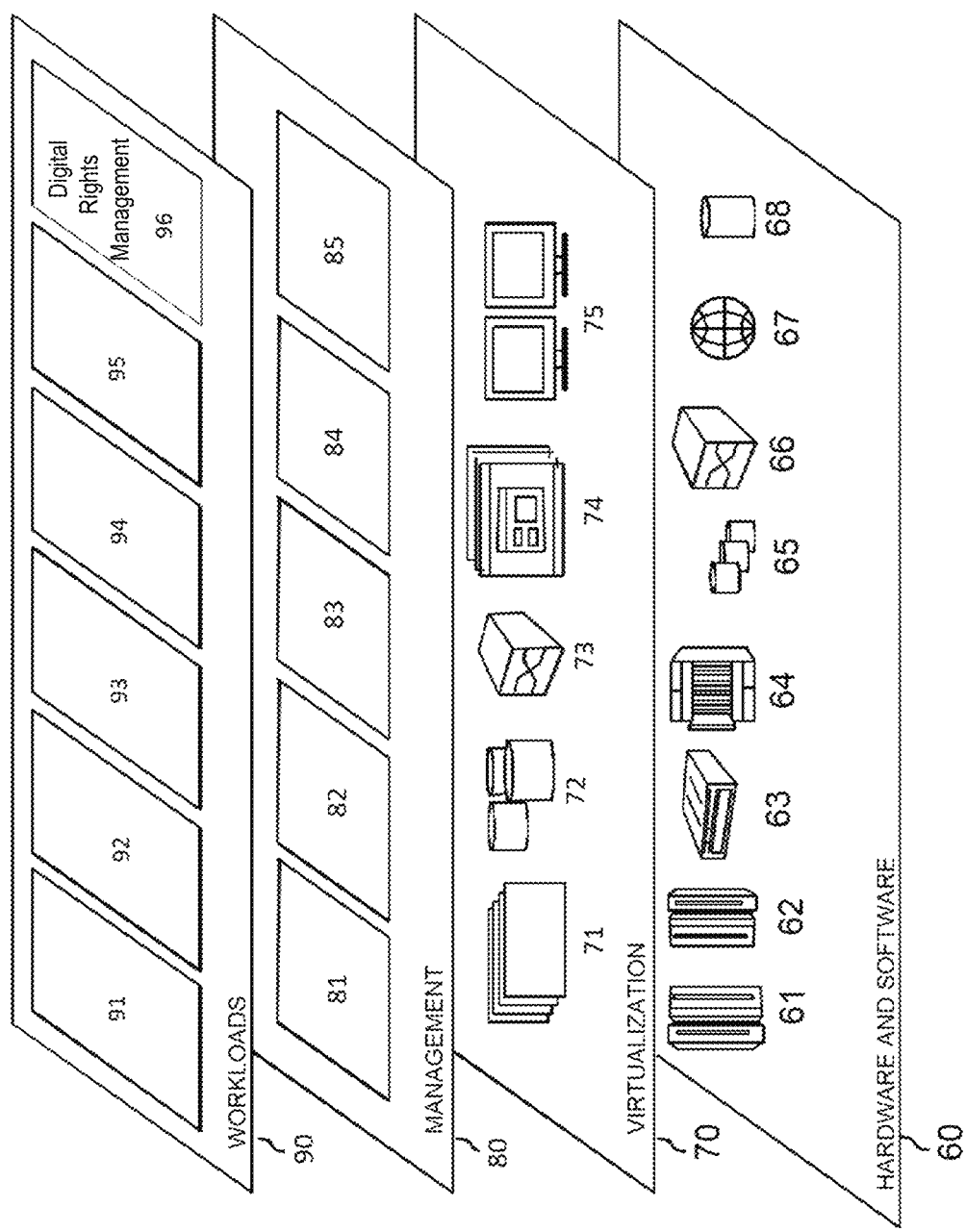
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and digital rights management 96.

Implementations of the invention may include a computer system/server 12 of FIG. 1 in which one or more of the program modules 42 are configured to perform (or cause the computer system/server 12 to perform) one of more functions of the digital rights management 96 of FIG. 3. For example, the one or more of the program modules 42 may be configured to: receive an artifact and a first token with a check-in request; apply a first level fragile watermark to the artifact, wherein the first level fragile watermark includes ownership information from the first token; receive a second token with a check-out request; apply a second level fragile watermark to a copy of the first level fragile watermarked artifact, wherein the second level fragile watermark includes authentication information from the second token; and transmit the second level fragile watermarked copy of the artifact to a client device.

Figure 4:
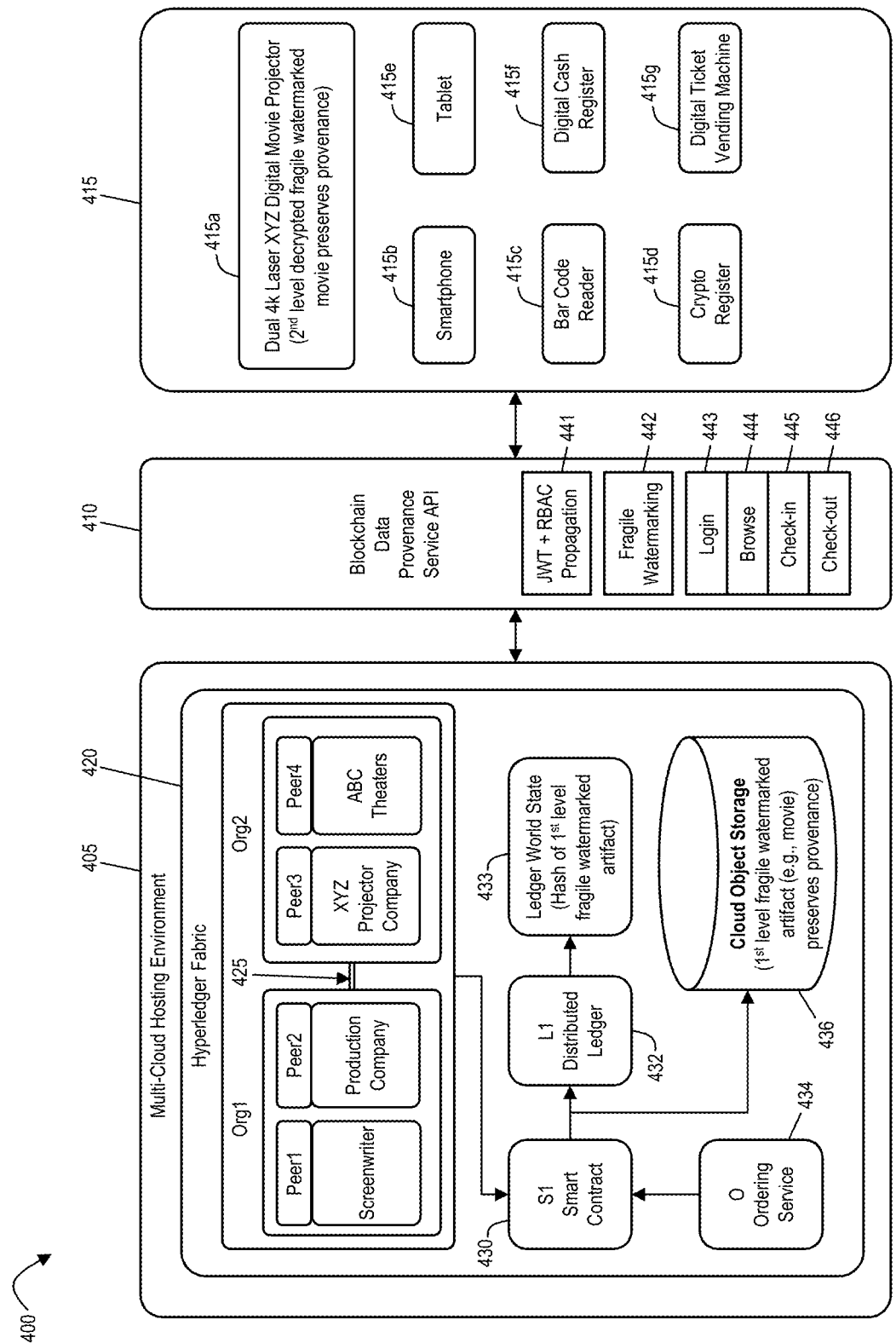
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a multi-cloud hosting environment 405, a blockchain data provenance services API system 410, and client devices 415. In embodiments, the multi-cloud hosting environment 405 is the cloud computing environment 50 of FIG. 2 comprising plural cloud computing nodes 10. According to aspects of the invention, certain ones of the plural cloud computing nodes 10 are arranged and organized in a Hyperledger Fabric 420, which is a permissioned blockchain infrastructure providing a modular architecture with a delineation of roles between the nodes in the infrastructure, execution of Smart Contracts (also called "chaincode") and configurable consensus and membership services. Nodes 10 included in the Hyperledger Fabric 420 are called "peer nodes" and may be configured to execute chaincode, access ledger data, endorse transactions and interface with applications. In embodiments, the Hyperledger Fabric 420 contains the operating system of an enterprise-strength permissioned blockchain network. Applications can be developed to interact with the blockchain network on behalf of the users. APIs are available to: create channels; ask peer nodes to join the channel; install chaincodes in peers; instantiate chaincodes in a channel; invoke transactions by calling the chaincode; and query the ledger for transactions or blocks.

In embodiments, each peer node comprises a computer server (e.g., such as a LinuxONE server), a logical partition (LPAR) of a computer server, or a virtual machine (VM) running on a computer server. The term "LinuxONE" may be subject to trademark rights in various jurisdictions throughout the world and are used here only in reference to the products or services properly denominated by the marks to the extent that such trademark rights may exist.

In embodiments, each peer node comprises a copy of a smart contract 430 and a ledger comprising a distributed ledger 432 and a world state 433. In embodiments, a network node (e.g., a node 10) in the Hyperledger Fabric 420 is assigned as the ordering service 434, and one or more network nodes (e.g. nodes 10) constitute a cloud object storage repository 436 in which first level watermarked copies of checked-in artifacts are stored.

In an exemplary embodiment shown in FIG. 4, the Hyperledger Fabric 420 comprises peer nodes Peer1, Peer2, Peer3, and Peer4, affiliated with blockchain stakeholders including a screenwriter, production company, XYZ projector company, and ABC Theaters, respectively. In accordance with aspects of the invention, the Hyperledger Fabric 420 containing the peers constitutes a digital rights management (DRM) blockchain network (referred to herein as DRM blockchain network or simply DRM blockchain). The exemplary peer nodes shown in FIG. 4 are for illustration and are not intended to limit aspects of the invention. Implementations of the invention may include a number of peer nodes different than that shown, and the peer nodes may be affiliated with types of stakeholders different than those shown.

In an exemplary implementation, each peer (e.g., Peer1, Peer2, Peer3, Peer4) is added to an organization, which is classified as either a movie producer organization or a movie consumer organization. The two organizations Org1, Org2 are then connected by a permissioned security channel 425. The DRM blockchain network includes the stakeholders who have voting rights within the consensus process for blockchain transaction storage and ordering. New stakeholders are added to the DRM blockchain network as peers. When a new peer is added, a peer container is created with a replicated version of the ledger and smart contract that all the other peers in the DRM blockchain network are also provided at the time of joining the peer network. These replicated peer containers are permissioned components within the Hyperledger Fabric 420. Each peer has access to its own peer container and is able to initiate blockchain related functions within that container. Since all peer containers within the DRM blockchain network are identical, the smart contract (S1) that initiates changes to a peer ledger (i.e. transaction) requires consensus and ordering (via the ordering service (O)) to commit that transaction to the ledger. Once consensus for a commit is achieved, all blockchain peers will have their ledgers updated by the smart contract in conjunction with the ordering service. This process keeps all ledgers, in all participating peers, exactly the same. The overall effect is the maintenance of a continuously updated distributed ledger, which in implementations is a set of peer containerized, duplicate, local ledgers.

In this manner, the DRM blockchain network advantageously eliminates latency that happens during the execution of unpredictable update processes, e.g., update batch processes that run at a specific time every morning over peer owned WAN legacy servers. Additionally, the DRM blockchain network advantageously provides a single source of truth by means of a local ledger that is updated continuously to match the all other peer ledgers. This results in the concept of a single 'distributed ledger' that maintains the single source of truth across the entire 'digital streaming media supply chain'. Moreover, the DRM blockchain network advantageously provides a tamper proof ledger. All peer ledgers are updated only through consensus among permissioned peers. Consensus is a mechanism unique to blockchain that seeks to ensure that all permissioned peers agree that the transaction under consideration should be committed to the ledger. Once the new transaction is committed to the ledger, it becomes part of the immutable, historical transaction log that is the blockchain ledger. Still further, the DRM blockchain network advantageously provides digital rights management functions for protected digital streaming media using robust fragile watermarking of every controlled artifact checked into the DRM library by the smart contract. It also provides check-out and browse capabilities as well as basic login and connectivity functions.

With continued reference to FIG. 4, the blockchain data provenance services API system 410 (referred to as the blockchain API system 410) comprises one or more nodes 10 at the edge of the multi-cloud hosting environment 405 (e.g., at the edge of the cloud computing environment 50 of FIG. 2). In accordance with aspects of the invention, the blockchain API system 410 communicates with each of the Hyperledger Fabric 420 and the client devices 415 via network communication, and serves as an intermediary between the DRM blockchain network and the client devices 415 for the purpose of exposing functions of the DRM blockchain network to the client devices 415 via API calls. In embodiments, the blockchain API system 410 comprises one or more computer devices that run one or more program modules (such as program modules 42 of FIG. 1) that perform one or more of the functions described herein. In an exemplary embodiment, these program modules include propagation module 441, fragile watermarking module 442, login module 443, browse module 444, check-in module 445, and check-out module 446.

In embodiments, the propagation module 441 is configured to determine whether a token received from one of the client devices 415 is valid for accessing the DRM blockchain network. When the token is valid, the propagation module 441 propagates the token back to the client application running on one of the client devices 415. When the token is not valid, the propagation module 441 prompts the user to login. In embodiments, the token is a JSON Web Token (JWT), and in particular a JWT+RBAC token (e.g., a JWT containing role based access control).

In embodiments, the fragile watermarking module 442 is configured to apply a first level fragile watermark to an artifact when an artifact is being checked-in to the DRM blockchain network. In one example, the fragile watermarking module 442 invokes a watermarking service (e.g., a web service) that embeds a first level fragile watermark into the artifact. In another example, the fragile watermarking module 442 itself is programmed to embed the first level fragile watermark into the artifact. In either event, the first level fragile watermarking process comprises using a fragile watermarking algorithm to encrypt information of the JWT+RBAC token into the artifact. For example, when a user performs a check-in process to check-in their artifact to the DRM blockchain network, the first level fragile watermarking process comprises using a fragile watermarking algorithm to encrypt information of that user's JWT+RBAC token in the artifact being checked-in. In this manner, provenance information that defines ownership of the artifact (e.g., as defined in the user's JWT+RBAC token) is embedded in the artifact at check-in of the artifact.

In embodiments, the login module 443 is configured to initiate a login transaction between a client device 415 and the DRM blockchain network. The login transaction establishes the JWT+RBAC token, which is used to watermark the digital media during the check-in and check-out transactions. The login transaction is the initial point of entry from the client application running on one of the client devices 415 to the DRM blockchain network. The login transaction is a smart contract that provides blockchain-based identity management during the login workflow. At the completion of the login transaction, the JWT+RBAC token is propagated back to the client application running on one of the client devices 415. Aspects of the login transaction are described herein at FIG. 8.

In embodiments, the browse module 444 is configured to initiate a browse transaction between a client device 415 and the DRM blockchain network. In an exemplary implementation, the browse module 444 is an API that receives a browse request from a client application of one of the client devices 415, initiates a browse transaction with the DRM blockchain network using a fabric SDK (software development kit) call, receives data from the DRM blockchain network in response to the fabric SDK call, and returns appropriate data to the client application that made the browse request.

In embodiments, the check-in module 445 is configured to initiate a check-in transaction between a client device 415 and the DRM blockchain network. In an exemplary implementation, the check-in module 445 is an API that receives a check-in request from a client application of one of the client devices 415, initiates a check-in transaction with the DRM blockchain network using a fabric SDK call, receives data from the DRM blockchain network in response to the fabric SDK call, and returns appropriate data to the client application that made the check-in request. Aspects of the check-in transaction are described herein at FIG. 9.

In embodiments, the check-out module 446 is configured to initiate a check-in transaction between a client device 415 and the DRM blockchain network. In an exemplary implementation, the check-out module 446 is an API that receives a check-out request from a client application of one of the client devices 415, initiates a check-out transaction with the DRM blockchain network using a fabric SDK call, receives data from the DRM blockchain network in response to the fabric SDK call, and returns appropriate data to the client application that made the check-out request. Aspects of the check-out transaction are described herein at FIG. 10.

Still referring to FIG. 4, the client devices 415 comprise computer devices that run a client application that is configured to communicate with the blockchain API system 410, e.g., via a network such as the Internet, to consume services provided by the DRM blockchain network. Examples of such computer devices include: a digital movie projector 415a; a smartphone 415b; a bar code reader 415c; a crypto-register 415d; a tablet computer 415e; a digital cash register 415f; and a digital ticket vending machine 415g. These examples are not limiting, and other types of client devices may be used to communicate with the blockchain API system 410. In embodiments, a user utilizes one of the client devices 415 to perform one or more of: check-in an artifact into the DRM blockchain network; browse artifacts stored in the DRM blockchain network; and check-out an artifact from the DRM blockchain network.

In embodiments, the blockchain API system 410 may include additional or fewer modules than those shown in FIG. 4. In embodiments, separate modules may be integrated into a single computing component or module. Additionally, or alternatively, a single module may be implemented as multiple computing components or modules. Further, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Devices of the environment 400 may interconnect via wired connections, wireless connections, or a combination of wired and wireless connections.

Still referring to FIG. 4, in embodiments, every blockchain peer represents a stakeholder, and every blockchain peer has the exact same smart contract (S1) and ledger (L1) which is synchronized according to a consensus algorithm encoded in the S1 smart contract. The Hyperledger Fabric 420 is a container based system whereby each blockchain peer is deployed inside the container. In one implementation, the container itself is deployed within an LPAR (Logical Partition) which is a virtual appliance offering a high degree of security by the LinuxONE platform.

Figure 5:
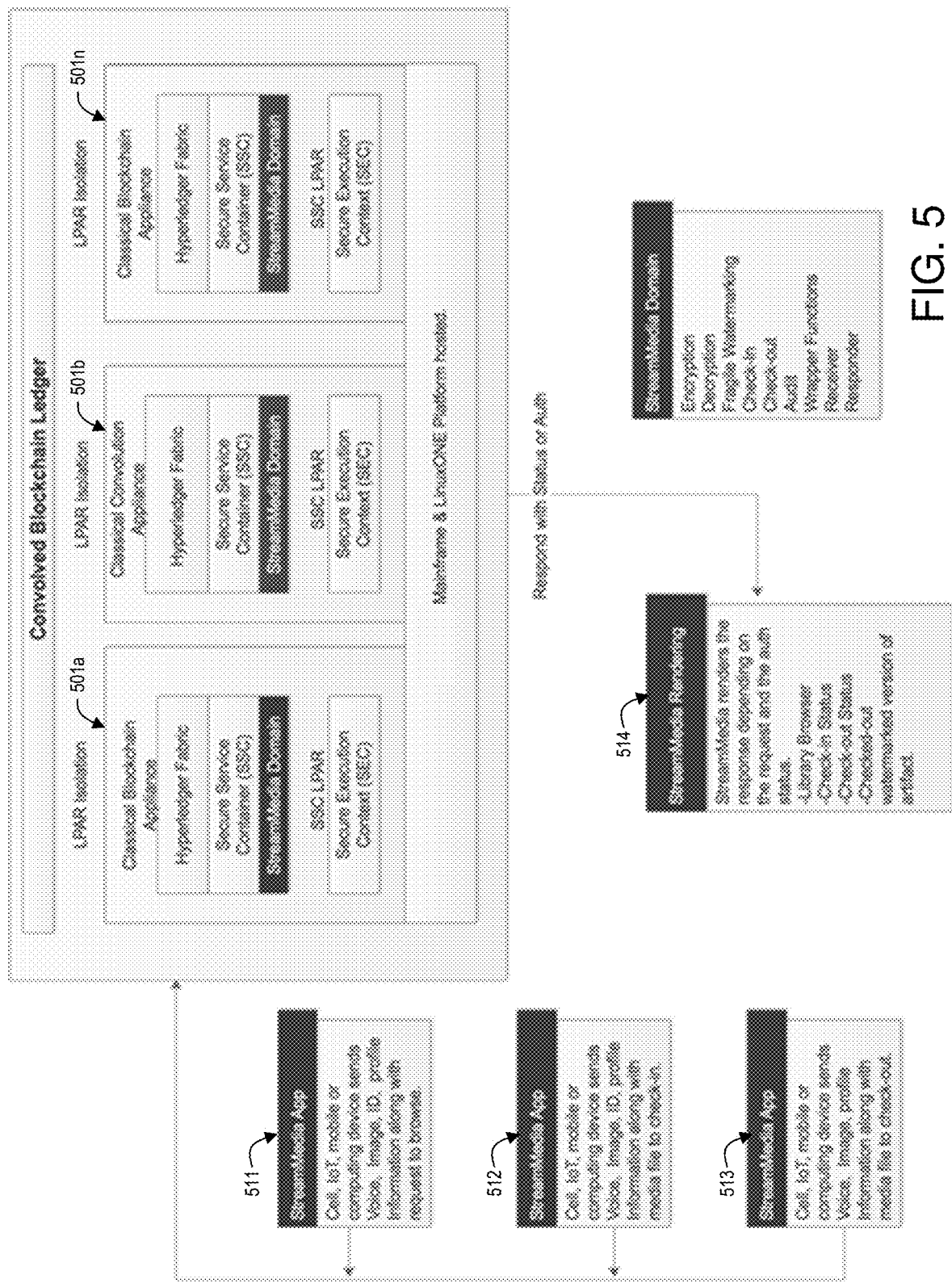
FIG. 5 shows a containerized view of aspects of the DRM blockchain network in accordance with aspects of the invention.

FIG. 5 shows a containerized view of aspects of the DRM blockchain network in accordance with aspects of the invention. As shown in FIG. 5, in embodiments, each peer in the DRM blockchain network comprises an LPAR 501a, 501b, . . . , 501n (or a VM) running in the Hyperledger Fabric 420. As shown in FIG. 5, in embodiments, the client application on one of the client devices 415 may comprise a "StreamMedia App" which is configured to send a request to browse (indicated at 511), a request to check-in (indicated at 512), or a request to check-out (indicated at 513). As described in FIG. 4, in embodiments, these requests are made through the blockchain API system 410. As shown in FIG. 5, in embodiments, the DRM blockchain network renders a response to the request (indicated at 514) based on the content of the request and the authorization status of the user making the request.

Figure 6:
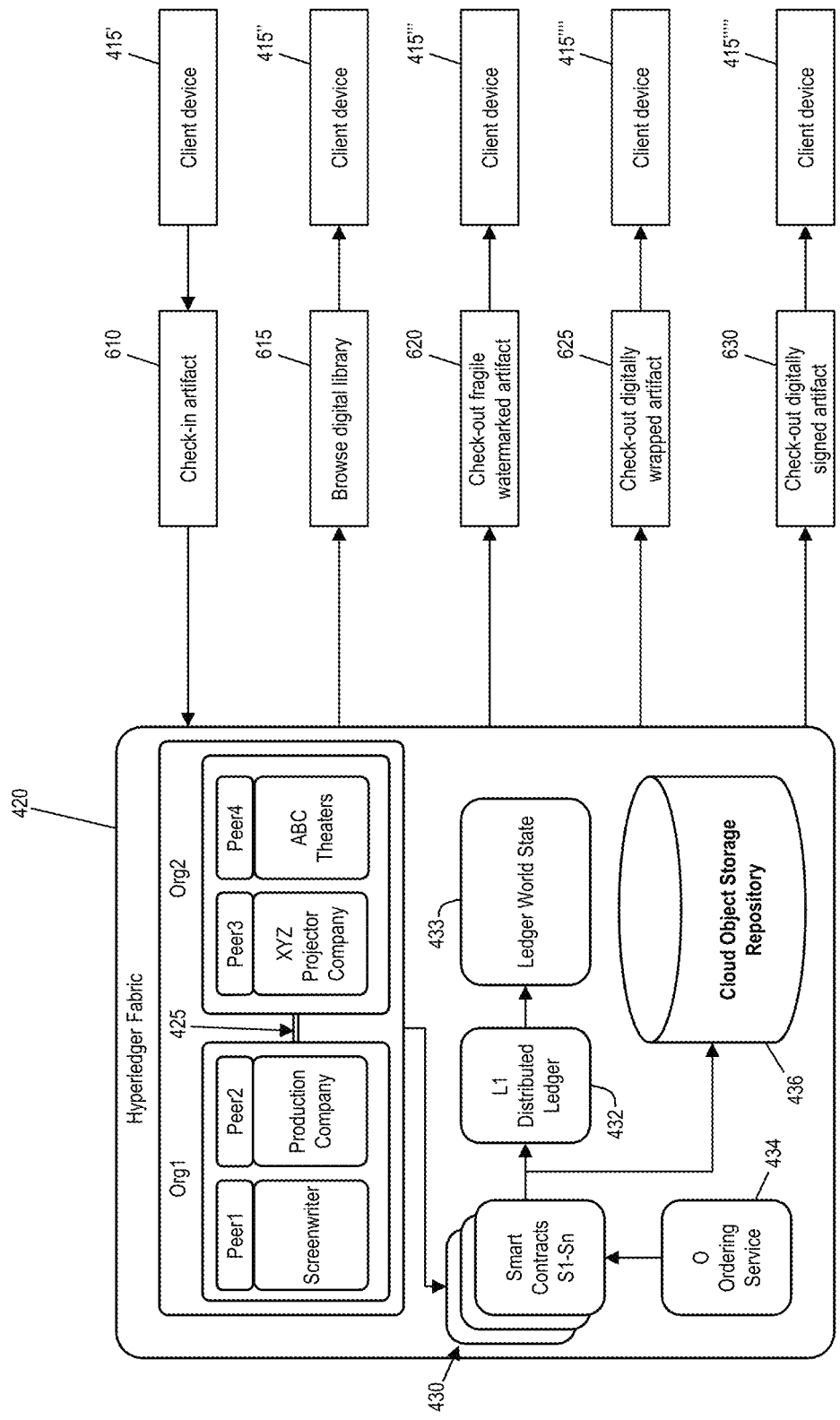
FIG. 6 shows a functional block diagram that illustrates aspects of the DRM blockchain network in accordance with aspects of the invention.

FIG. 6 shows a functional block diagram that illustrates aspects of the DRM blockchain network in accordance with aspects of the invention. The functions of the block diagram of FIG. 6 may be performed in the environment 400 of FIG. 4 and are described with reference to elements depicted in FIG. 4. As described herein, in embodiments, each peer in the DRM blockchain network (e.g., implemented in the Hyperledger Fabric 420) has its own copy of the smart contract 430 and the ledger comprising distributed ledger 432 and world state 433. In embodiments, the smart contract 430 comprises plural smart contracts S1-Sn (where "n" is any positive integer), each of which includes the logic (e.g., chaincode) to perform one of the processes performed by the DRM blockchain network.

For example, as shown in FIG. 6, when a client device 415' makes an authenticated request to check-in an artifact, a first one of the smart contracts S1-Sn performs the check-in function indicated at block 610. In this example, when a client device 415" makes an authenticated request to browse the digital library stored in the DRM blockchain network, a second one of the smart contracts S1-Sn performs the browse function indicated at block 615. In this example, when a client device 415''' makes an authenticated request to check-out a fragile watermarked artifact, a third one of the smart contracts S1-Sn performs the check-out function indicated at block 620. In this example, when a client device 415'''' makes an authenticated request to check-out a digitally wrapped artifact, a fourth one of the smart contracts S1-Sn performs the check-out function indicated at block 625. In this example, when a client device 415" " makes an authenticated request to check-out a digitally signed artifact, a fifth one of the smart contracts S1-Sn performs the check-out function indicated at block 630. In all of these cases in this example, the requests are made by the client device via the blockchain API system 410 and using a JWT+RBAC token as described with respect to FIG. 4, with the blockchain API system 410 making respective fabric SDK calls to the DRM blockchain network to initiate the respective functions 610, 615, 620, 625, 630.

Still referring to FIG. 6, in embodiments, the DRM blockchain network is configured to provide a number of different ways to check-out an artifact. In this example, there are three ways including: fragile watermarked; digitally wrapped; and digitally signed. In the fragile watermarked option, authentication information (e.g., JWT+RBAC data) is embedded in the artifact itself, and it is this authentication information that must be satisfied by a client device attempting to view the artifact. In the digitally wrapped option, the artifact is wrapped in a JavaScript wrapper that contains authentication information that must be satisfied by a client device attempting to view the digitally wrapped artifact. In the digitally signed option, the artifact is digitally signed in a manner that permits the artifact to be seen by humans when displayed on a client device, but that prevents the artifact from being captured by a digital camera when displayed on a client device. These three options may be provided at different service levels for customers of the DRM blockchain network.

Figure 7:
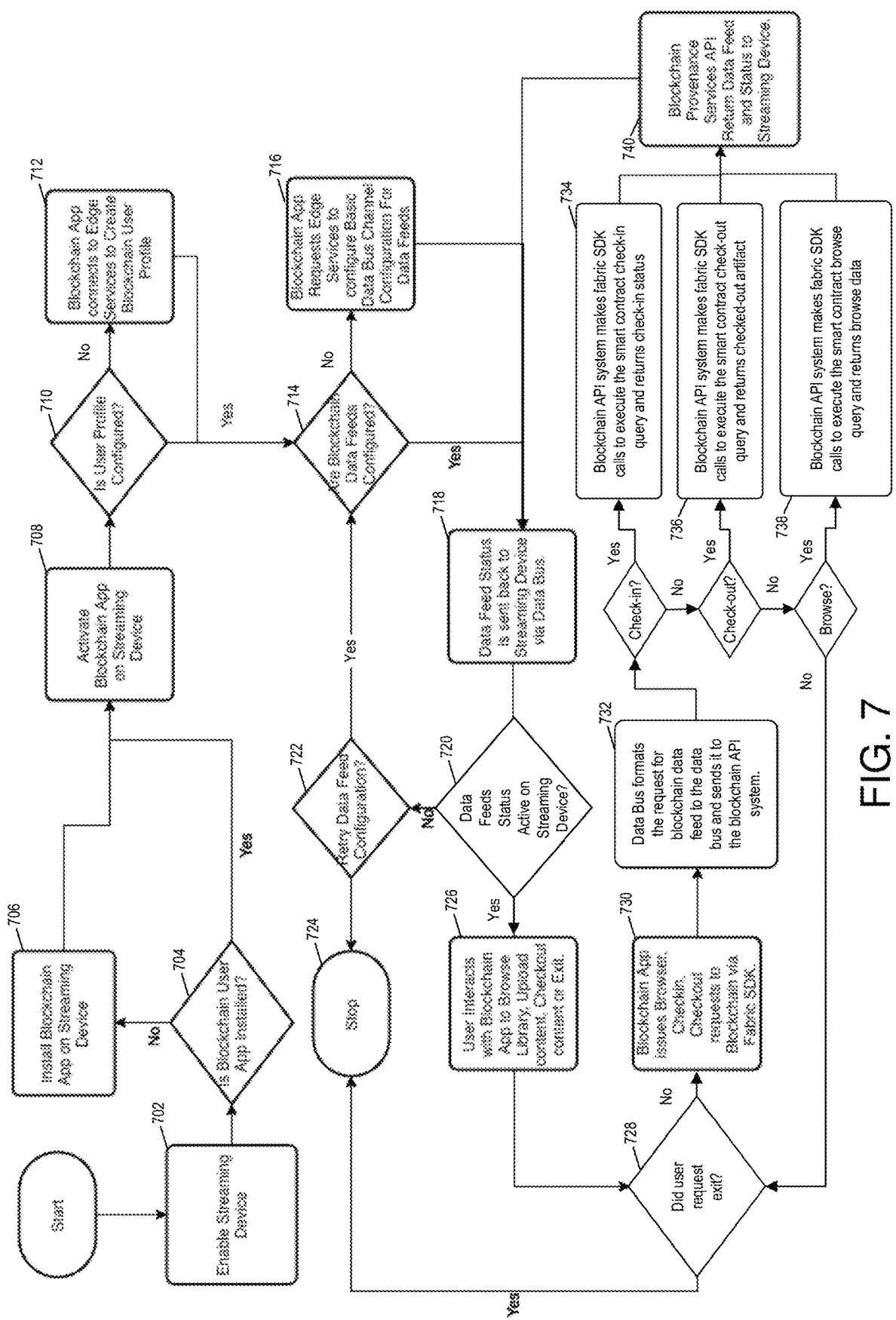
FIG. 7 shows a flowchart of an exemplary data feed interaction workflow, between a client device and the DRM blockchain network, in accordance with aspects of the present invention.

FIG. 7 shows a flowchart of an exemplary data feed interaction workflow, between a client device and the DRM blockchain network, in accordance with aspects of the present invention. Steps of the method may be carried out in the environment of FIG. 4 and are described with reference to elements depicted in FIG. 4.

At step 702, a user enables a streaming device (e.g., one of client devices 415), which may comprise initializing or turning on the streaming device, for example. At step 704, the user determines whether the client application (e.g., referred to in this example as "blockchain app") for interfacing with the DRM blockchain network is installed on the streaming device. If the blockchain app is not installed on the streaming device, then at step 706 the user installs the blockchain app on the streaming device, e.g., from an app store. If the blockchain app is already installed on the streaming device at step 704, or after installing the blockchain app on the streaming device at step 706, then at step 708 the user activates the blockchain app on the streaming device, e.g., by opening the app.

At step 710, the blockchain app determines whether a user profile is configured. If a user profile is not configured, then at step 712 the blockchain app contacts the edge services (e.g., the blockchain API system 410) to create a blockchain user profile for this user. If the user profile is already configured at step 710, or after creating the user profile at step 712, then at step 714 the blockchain app determines whether blockchain data feeds are configured for this user profile. In embodiments, this comprises the blockchain app asking the edge services whether blockchain data feeds are configured for this user profile. If the blockchain data feeds are not configured for this user profile, then at step 716 the blockchain app asks the edge services to configure a basic data bus channel configuration for data feeds for this user profile. In embodiments, the data feed configurations are based on the user's subscription details, and different users may have different data feed configurations based on different subscriptions.

If the data feeds are already configured at step 714, or after configuring the data feeds at step 716, then at step 718 the edge services send the data feed status back to the streaming device. At step 720, the blockchain app determines whether the data feed status is active on the streaming device, e.g., using the data feed configuration from step 718. If the data feed status is not active using this data feed configuration, then at step 722 the blockchain app asks the user whether the uses wishes to retry the data feed configuration process. If the user provides input answering yes to this query, then the process returns to step 714 where the data feed configuration process is performed again. If the user provides input answering no to this query, then the process ends at step 724.

If the data feed status is active on the streaming device at step 720, then at step 726 the user interacts with the blockchain app to perform one of: browse library; check-in content; check-out content; and exit. In embodiments, this comprises the user providing input to the blockchain app via the I/O system of the streaming device, such as via a touchscreen input. At step 728, the blockchain app determines whether the user provided input to exit the blockchain app. If the user did provide input to exit, then the blockchain app closes on the streaming device and the process stops at step 724. If the user did not provide input to exit (e.g., the user instead provided input to browse, check-in, or check-out), then at step 730 the blockchain app issues the selected request (e.g., browse, check-in, or check-out), which will be sent to the DRM blockchain network using one or more fabric SDK calls. At step 732, the data bus formats the request and sends it to the blockchain API system 410.

If the request is a check-in request, then at step 734 the blockchain API system 410 makes one or more fabric SDK calls to the DRM blockchain network to execute the appropriate smart contract for a check-in request, and returns a status of the check-in request to the blockchain app. In embodiments, step 734 comprises steps 903-909 of the check-in method of FIG. 9.

If the request is a check-out request, then at step 736 the blockchain API system 410 makes one or more fabric SDK calls to the DRM blockchain network to execute the appropriate smart contract for a check-out request, and returns the checked-out artifact (e.g., a second level fragile watermarked artifact) to the streaming device. In embodiments, step 736 comprises steps 1006-1009 of the check-out method of FIG. 10.

If the request is a browse request, then at step 738 the blockchain API system 410 makes one or more fabric SDK calls to the DRM blockchain network to execute the appropriate smart contract for a browse request, and returns browse data (e.g., blockchain library catalog data) to the blockchain app.

At step 740, the blockchain API system 410 returns the data feed and status of the request from one of steps 734, 736, and 738 to the streaming device. The process then returns to step 718. Embodiments of the invention contemplate a first user checking in an artifact using the check-in process described herein, and a second used different than the first user checking out a copy of the artifact using the check-out process described herein, with the watermarking described herein providing provenance information and access control for the copy of the artifact.

Figure 8:
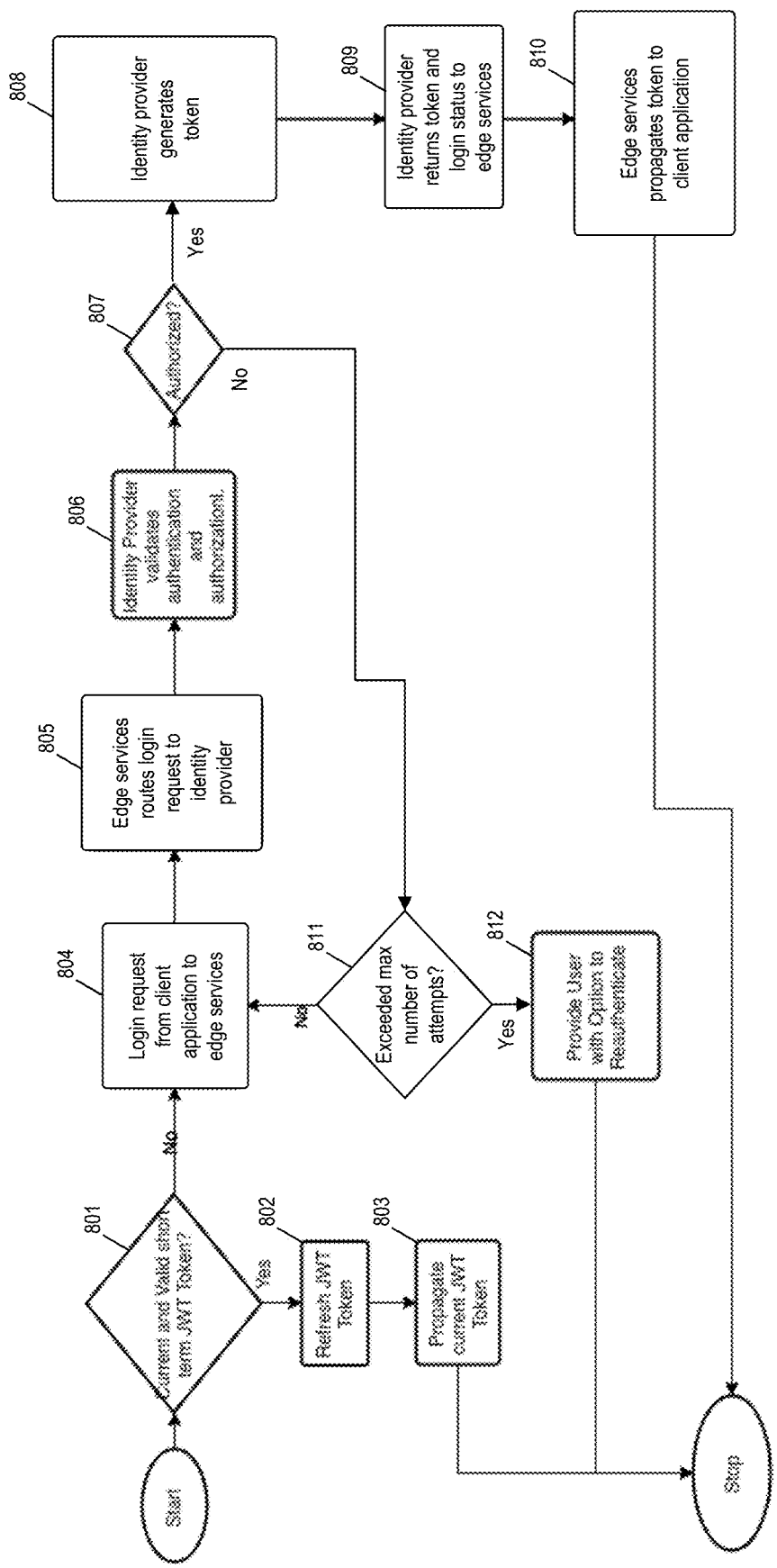
FIG. 8 shows a flowchart of an exemplary login method in accordance with aspects of the present invention.

FIG. 8 shows a flowchart of an exemplary login method in accordance with aspects of the present invention. In embodiments, the login method shown in FIG. 8 utilizes the JWT (json web token) for OAuth 2.0 client authentication and authorization. Steps of the method may be carried out in the environment of FIG. 4 and are described with reference to elements depicted in FIG. 4. In an example embodiment, certain steps of the method that are performed by the edge services are performed by the propagation module 441 or the login module 443 of the blockchain API system 410 as shown in FIG. 4.

At step 801, the edge services (e.g., the blockchain API system 410) determines whether the client application running on the client device (e.g., one of client devices 415) has a current and valid short term token (i.e., a current and valid JWT token for interacting with the DRM blockchain). The client application at step 801 may be the blockchain app or the streaming app previously referred to herein. If the determination is yes, then at step 802 the edge services refresh the JWT token and at step 803 the edge services propagate the current JWT token to the client application. At this point, the login is complete for a user whose token was determined as current and valid at step 801, and the user can then use the client application to perform functions such as browse, check-in, and check-out as described herein.

If the determination at step 801 is no, then at step 804 the client application sends a login request to the edge services. The login request may include login credentials, such as username and password that the user enters into the client application. At step 805, the edge services route the login request (from step 804) to an identity provider. In embodiments, the identity provider is a web service and the edge services communicate with a server of the web service via network communication. In embodiments, the login request at step 804 and the routing to the service provider at step 805 are made using the OAuth 2.0 protocol.

At step 806, the identity provider attempts to validate the authentication and provide authorization based on the information contained in the request. In embodiments, the identity provider compares the information included in the request to stored information that defines authenticated users. If the identity provider determines this user is authorized at step 807, then at step 808 the identity provider generates a token for this user. In embodiments, the token is an OAuth 2.0 JWT+RBAC token with extended payload that is configured to include provenance data for fragile watermarking used in either check-in check-out processes described herein.

At step 809, the identity provider returns the token (from step 808) to the edge services. In embodiments, step 809 also includes the identity provider returning a status of the login (e.g., success) to the edge services. At step 810, the edge services propagate the token (from step 809) to the client application. In this manner, the client application can use the token in future API calls to the edge services during this login session.

If the identity provider determines this user is not authorized at step 807, then the identity provider indicates the authorization failure to the edge services. At step 811, the edge services determine whether the user has exceeded a maximum number of login attempts, which may be any desired number such as five attempts. If the user has not exceeded the maximum number, then the process returns to step 809 where the user may attempt to login in again, e.g., by inputting their login credentials to the client application. If at step 811 the user has exceeded the maximum number of login attempts, then at step 812 the edge services prompts the user with an option to re-authenticate using another mechanism.

Figure 9:
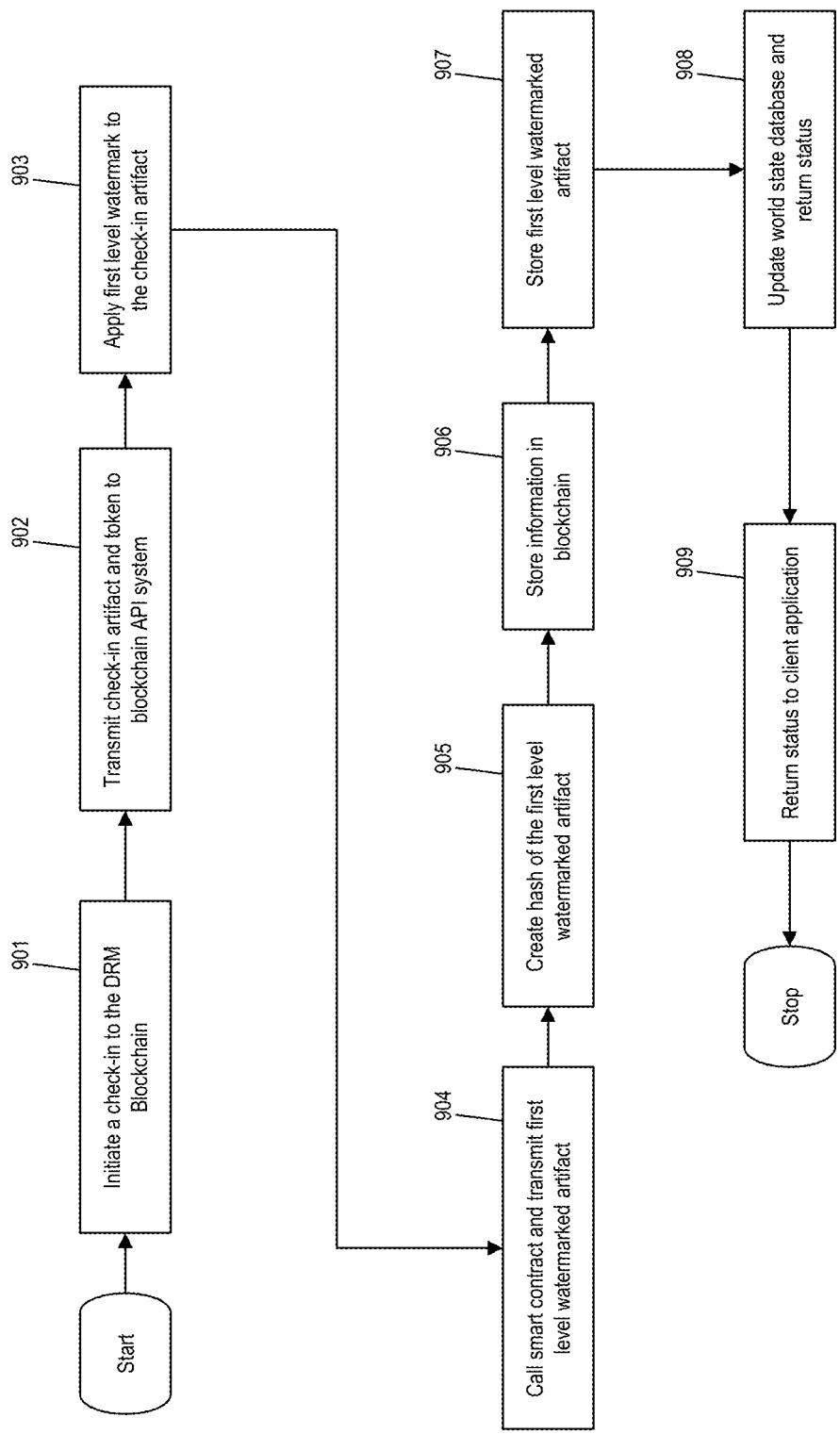
FIG. 9 shows a flowchart of an exemplary check-in method in accordance with aspects of the present invention.

FIG. 9 shows a flowchart of an exemplary check-in method in accordance with aspects of the present invention. Steps of the method may be carried out in the environment of FIG. 4 and are described with reference to elements depicted in FIG. 4. In an example embodiment, certain steps of the method that are performed by the edge services are performed by the fragile watermarking module 442 or the check-in module 445 of the blockchain API system 410 as shown in FIG. 4, and certain steps that are performed by the DRM blockchain network are performed by a smart contract 430 as shown in FIG. 4.

At step 901, the user initiates a check-in process with the DRM blockchain network. In embodiments, after logging in and obtaining a token as described in the method of FIG. 8, the user provides input to the client application to start a check-in of an artifact to the DRM blockchain library. According to aspects of the invention, the JWT+RBAC token that is obtained during the login process is a json file that contains authentication and authorization information for this particular user, as well as a public/secret key, that will be used to generate the first level fragile watermark to establish provenance of the artifact being checked-in. The first level watermarked version of the artifact that results from the check-in process is a pristine version of the artifact that is stored in the DRM blockchain network, and which is subsequently used to generate a second level fragile watermarked copy that is provided to a user that performs the check-out process.

At step 902, the client application running on the client device (e.g., one of client devices 415) transmits the artifact and the user's token to the edge services. In embodiments, step 902 comprises the client application formatting the check-in rest API request and transmitting the API request including the artifact and the user's JWT+RBAC token to the edge services (e.g., the blockchain API system 410).

At step 903, the edge services cause a first level watermark to be applied to the artifact that was transmitted at step 902. In one example, the fragile watermarking module 442 invokes a watermarking service (e.g., a web service) that embeds a first level fragile watermark into the artifact. In another example, the fragile watermarking module 442 is programmed to embed the first level fragile watermark into the artifact. In either event, the first level fragile watermarking process comprises using a fragile watermarking algorithm to encrypt information of the JWT+RBAC token into the artifact.

At step 904, the edge services calls a smart contract of the DRM blockchain network and transmits the first level fragile watermarked artifact (from step 903) to the smart contract. In embodiments, the check-in module 445 makes a fabric SDK call to the check-in smart contract on one of the nodes in the DRM blockchain network. In embodiments, the call includes the first level fragile watermarked artifact, which includes identifying information of the user (e.g., the owner/author of the artifact) along with the user's JWT+RBAC attributes.

At step 905, the smart contract that received the call at step 904 creates a hash of the first level fragile watermarked artifact. In embodiments, the check-in smart contract uses a hashing algorithm to create the hash.

At step 906, the smart contract causes information about the first level fragile watermarked artifact to be stored in the blockchain. In embodiments, the check-in smart contract requests that the ordering service 434 store the hash (from step 905) in the blockchain (e.g., the ledger 432 and the ledger world state 433) along with the object storage location and access information.

At step 907, the smart contract stores the first level fragile watermarked artifact in the DRM blockchain network. In embodiments, the check-in smart contract stores the first level fragile watermarked artifact in the object storage repository 436.

At step 908, the smart contract updates the world state database and returns a status of the check-in transaction to the edge services. In embodiments, the check-in smart contract updates the ledger world state 433 with the transaction information of the check-in transaction and returns a status of the check-in transaction to the check-in module 445.

At step 909, the edge services returns a status of the check-in transaction to the client application. In embodiments, the check-in module 445 transmits a status message to the client application running on the client device, the status message indicating that the check-in is complete. In this manner, the method of FIG. 9 may be used to check-in a copy of an artifact with the DRM blockchain library, to have that copy watermarked with provenance information of the author/owner of the artifact, and to have the watermarked copy stored in the DRM blockchain library for subsequent check-out by other authorized users.

Figure 10:
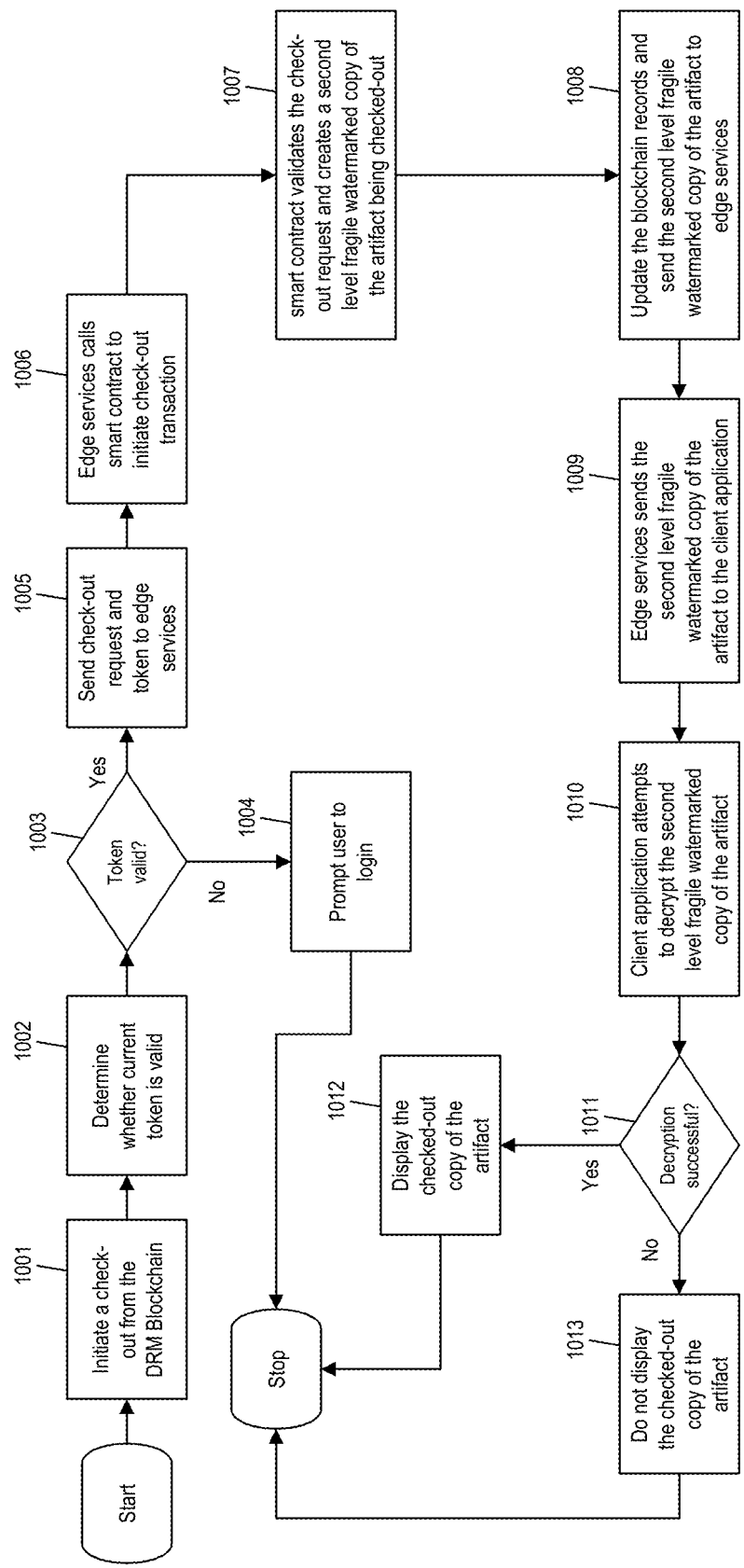
FIG. 10 shows a flowchart of an exemplary check-out method in accordance with aspects of the present invention.

FIG. 10 shows a flowchart of an exemplary check-out method in accordance with aspects of the present invention. Steps of the method may be carried out in the environment of FIG. 4 and are described with reference to elements depicted in FIG. 4. In an example embodiment, certain steps of the method that are performed by the edge services are performed by the check-out module 446 of the blockchain API system 410 as shown in FIG. 4, and certain steps that are performed by the DRM blockchain network are performed by a smart contract 430 as shown in FIG. 4.

At step 1001, the user initiates a check-out process with the DRM blockchain network. In embodiments, the user provides input to the client application running on a client device (e.g., one of client devices 415) to start a check-out.

At step 1002, the client application initiates a determination of whether it has a current and valid token for interacting with the DRM blockchain network. In embodiments, the client application sends a JWT-RBAC preflight request for token validation to the edge services.

At step 1003, the edge services (e.g., the blockchain API system 410) determines whether the token received in the preflight request is still valid. Step 1003 may be performed in the same manner as step 801 of FIG. 8. If the token is not valid at step 1003, then at step 1004 the edge services send the client application to the login process, e.g., beginning at step 804 of FIG. 8.

At step 1005, the client application sends a check-out request and a token to the edge services. In embodiments, the client application sends the current and validated JWT+RBAC token to the blockchain API system 410. In embodiments, this token is a token that is generated for the user that is currently logged-in and performing the check-out process, and may be different than the token used at steps 902 and 903.

At step 1006, the edge services receives the check-out request and calls a smart contract to initiate the check-out transaction. In embodiments, the check-out module 445 makes a fabric SDK call to the check-out smart contract, the call including the check-out request, the name of the artifact being requested for check-out, and JWT+RBAC data from the token received at step 1005.

At step 1007, the smart contract validates the check-out request and creates a second level fragile watermarked copy of the artifact being checked-out. In embodiments, the check-out smart contract validates that the user associated with the JWT-RBAC data (of the token received at step 1005) is authorized to check-out the requested artifact. In embodiments, step 1007 also includes the check-out smart contract validating the blockchain stored hash with the first level fragile watermarked artifact that is stored in the object storage repository 436. In embodiments, after validating the hash versus the stored first level fragile watermarked artifact, the check-out smart contract makes a copy of the first level fragile watermarked artifact and embeds the copy with a second level fragile watermark. In accordance with aspects of the invention, the second level fragile watermark includes a public/secret key based on the JWT-RBAC data of the token received at step 1005. In this manner, the checked-out copy of the artifact is encrypted using authentication information (via the second level fragile watermark) that restricts the checked-out copy of the artifact to being viewed only a client device that has a credential that satisfies the encrypted authentication information. In embodiments, the checked-out copy of the artifact includes both the first level watermark (e.g., based on the JWT-RBAC information of the user that checked-in the artifact) and the second level watermark (e.g., based on the JWT-RBAC information of the user that checked-out the artifact).

At step 1008, the smart contract updates the blockchain and transmits the second level fragile watermarked copy of the artifact to the edge services. In embodiments, the check-out smart contract requests that the ordering service update the blockchain transaction log with the check-out request for this artifact, and the world state database is updated with this check-out transaction. In this manner, the blockchain is updated to include an immutable record of this check-out transaction. In embodiments, the record of the transaction includes: information identifying the artifact being checked-out; information identifying the user requesting the check-out; and date and time of the check-out. In accordance with aspects of the invention, the check-out smart contract notifies the edge services that the check-out request is successful (e.g., granted), and transmits the second level fragile watermarked copy of the artifact to the edge services along with the propagated JWT+RBAC token.

At step 1009, the edge services forwards the second level fragile watermarked copy of the artifact to the client application from which the check-out was requested.

At step 1010, the client application receives and attempts to decrypt the second level fragile watermarked copy of the artifact. In embodiments, the client application attempts to decrypt the second level fragile watermarked copy of the artifact with the public/secret key that is maintained in the JWT-RBAC token that is stored by the client application.

At step 1011, the client application determines whether the decryption was successful. If the public/secret key possessed by the client application satisfies the encryption information in the second level fragile watermarked copy of the artifact, then decryption is successful and the process proceeds to step 1012, where the client device is permitted to display the checked-out copy of the artifact to a user. Also at step 1012, the client application returns the artifact and successful checkout status to the edge services. If the public/secret key possessed by the client application does not satisfy the encryption information in the second level fragile watermarked copy of the artifact, then decryption is unsuccessful and the process proceeds to step 1013, where the client device is not permitted to display the checked-out copy of the artifact to a user. Step 1013 may also include the client application notifying the user that the requested check-out was unsuccessful.

In this manner, the method of FIG. 10 may be used to check-out a copy of an artifact from the DRM blockchain library, where the checked-out copy is fragile watermarked in a manner such that: (i) a client device can display the checked-out artifact when the client device has credentials that satisfy the key in the second level fragile watermark that is embedded in the copy of the checked-out artifact; and (ii) a client device cannot display the checked-out artifact when the client device does not have credentials that satisfy the key in the second level fragile watermark that is embedded in the copy of the checked-out artifact. In this manner, implementations of the invention provide a digital rights management tool to help ensure that only the authorized user is able to view the checked-out copy of the artifact. If an unauthorized user (i.e., a user that does not possess the proper credential) attempts to view the checked-out copy of the artifact, the second level watermark that is embedded in the checked-out copy of the artifact obfuscates or destroys the checked-out copy of the artifact based on a determination that the client device of the unauthorized user does not have a credential that satisfies the security encryption in the second level watermark. In this manner, even if the checked-out copy is passed around to other unauthorized users, those unauthorized users are prevented from viewing the checked-out copy due to the security encryption in the second level watermark.

Figure 11:
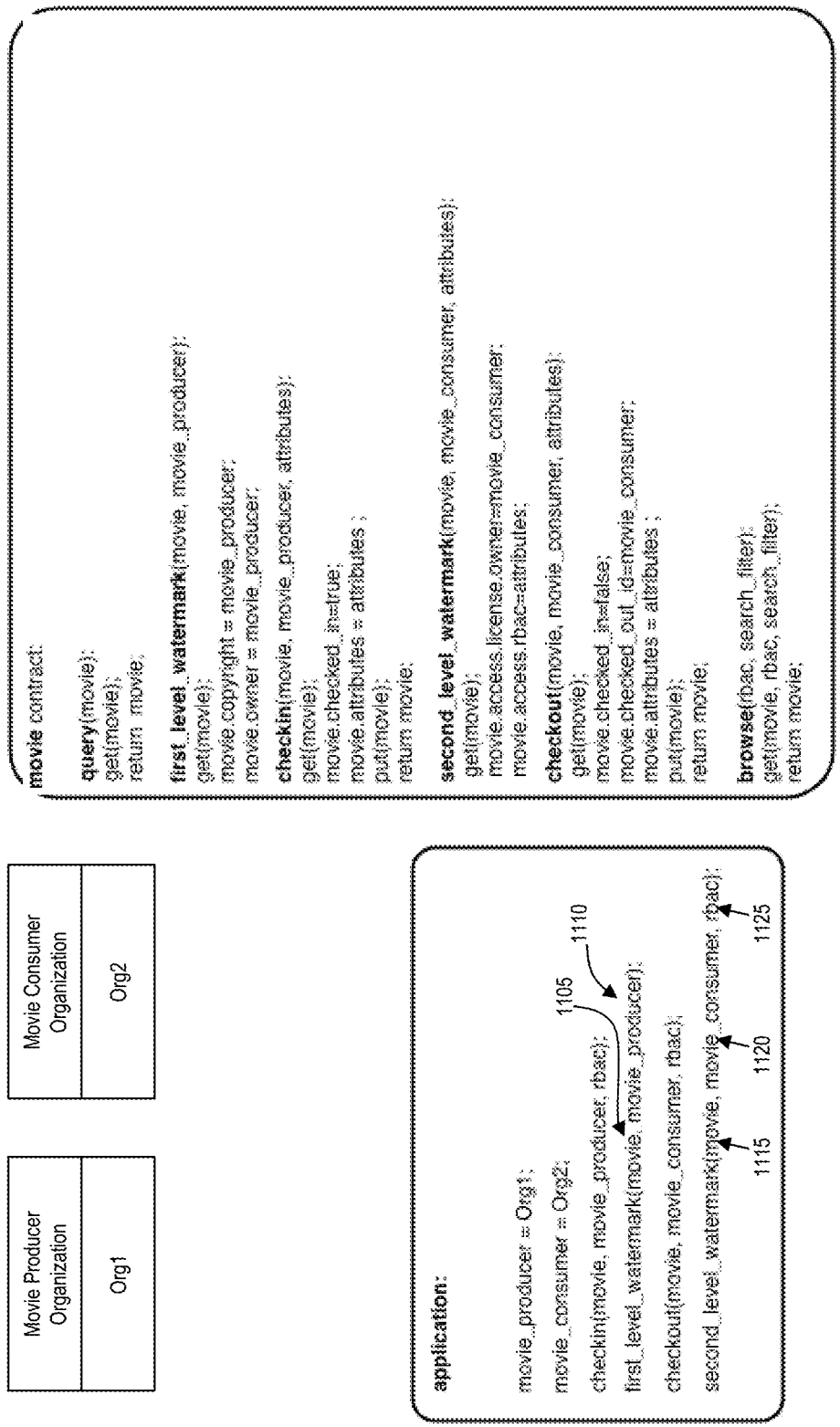
FIGS. 11-13 depict aspects of an exemplary use case in accordance with aspects of the invention.
Figure 12:
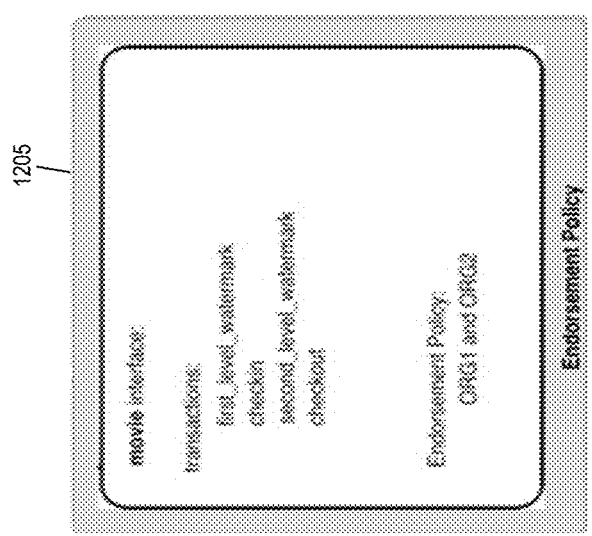
Figure 13:
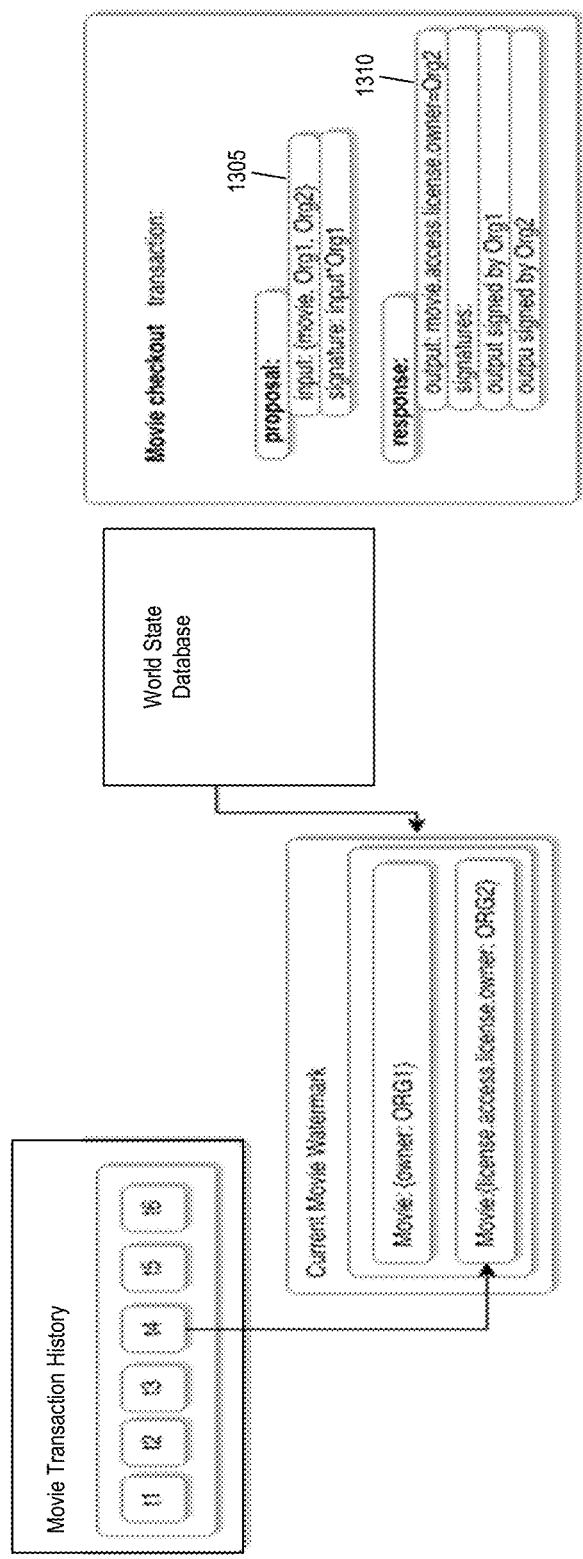

FIGS. 11-13 depict aspects of an exemplary use case in accordance with aspects of the invention. Aspects of the use case may be carried out in the environment of FIG. 4 and are described with reference to elements depicted in FIG. 4. In this use case, an enterprise called "ABC Theaters" wishes to improve their business operations by joining the DRM blockchain. In embodiments, as described herein, the blockchain implements a method to secure digital streaming media (e.g., video content) using robust fragile watermarks based on provenance and role based access control information. In this use case, certain stakeholders (e.g., Screenwriter, Production Company, XYZ Projector Company, and ABC Theaters) have become a peer in the DRM blockchain peer network, as shown in FIG. 4. However, before ABC Theaters is able to create movie transactions with other blockchain peers like the Production Company, a common set of contracts that will cover terms, data, rules, concepts and required processes is clarified. These contracts comprise a business model that governs the transactions between the stakeholders.

At the simplest level, a blockchain immutably records transactions which update states in a ledger. A smart contract programmatically accesses two distinct pieces of the ledger: a blockchain, which immutably records the history of all transactions, and a world state that holds a cache of the current value of these states, as it is the current value of an object that is usually required. Smart contracts primarily put, get and delete states in the world state, and can also query the immutable blockchain record of transactions. A get typically represents a query to retrieve information about the current state of a business object. A put typically creates a new business object or modifies an existing one in the ledger world state. A delete typically represents the removal of a business object from the current state of the ledger, but not its history. Smart contracts have many APIs available to them. In all cases, whether transactions create, read, update or delete business objects in the world state, the blockchain contains an immutable record of these changes.

FIG. 11 shows an exemplary smart contract that defines the rules between the stakeholders in the blockchain peer network in this use case. The focus in this smart contract is implementing the security of the digital streaming media via robust fragile watermarking. In FIG. 11, two organizations Org1 and Org2 (e.g., from FIG. 4) have defined a movie smart contract to query, first level watermark a digital artifact (e.g., a movie), and second level watermark the digital artifact. Applications from these organizations invoke this smart contract to perform an agreed step in a business process, for example to establish copyright and ownership of a specific movie to Org1, and to establish the access rights of the same specific movie to Org2.

In the example shown in FIG. 11, the artifact is a digital movie named "movie", the owner of the artifact is "movie producer", and it is "movie producer" who performs the check-in process of FIG. 9. As shown in FIG. 11, and as described with respect to FIG. 9, the first level watermark that is applied to the copy of the digital movie includes information 1105 identifying the artifact ("movie") and information 1110 identifying the owner ("movie producer"). As additionally shown in FIG. 11, the user wishing to have access to the artifact is "movie consumer", and it is this user that performs the check-out process of FIG. 10. As further shown in FIG. 11, and as described with respect to FIG. 10, the second level watermark that is applied to the copy of the digital movie includes information 1115 identifying the artifact ("movie"), information 1120 identifying the user requesting check-out ("movie consumer"), and access control information 1125 associated with the user requesting check-out ("rbac").

FIG. 12 shows an endorsement policy 1205 for the Movie Smart Contract. An endorsement policy indicates which organizations in a blockchain network must sign a transaction generated by a given smart contract in order for that transaction to be declared valid. All transactions, whether valid or invalid are added to a distributed ledger, but only valid transactions update the world state. If an endorsement policy specifies that more than one organization must sign a transaction, then the smart contract must be executed by a sufficient set of organizations in order for a valid transaction to be generated. In the use case of FIGS. 11-13, a smart contract transaction to watermark a digital media movie would need to be executed and signed by both Org1 and Org2 for it to be valid. Compared to other types of blockchain in which valid transactions can be generated by any node in the network, Hyperledger Fabric more realistically models the real world because its transactions must be validated by trusted organizations in a network. In this exemplary use case, both the movie producer and movie consumer of a digital streaming movie must sign a movie ticketing or licensing (watermarking) transaction.

Endorsement policies are designed to allow Hyperledger Fabric to better model these types of real-world interactions. Finally, endorsement policies are just one example of policy in Hyperledger Fabric. Other policies can be defined to identify who can query or update the ledger, or add or remove participants from the network. In general, policies should be agreed in advance by the consortium of organizations in a blockchain network, although they are not permanent. Indeed, policies themselves can define the rules by which they can be changed. It is also possible to define custom endorsement policy rules over and above those provided by Fabric.

In embodiments, when the movie smart contract executes, it runs on a peer node owned by an organization in the blockchain network. The smart contract takes a set of input parameters called the transaction proposal and uses them in combination with its program logic to read and write the ledger. Changes to the world state are captured as a transaction proposal response (or just transaction response) which contains a read-write set with both the states that have been read, and the new states that are to be written if the transaction is valid. The world state is not updated when the smart contract is executed.

FIG. 13 shows the overall design of the valid checkout transaction in this exemplary use case. The movie second level watermark transaction shows the licensing watermarking transaction. Transaction t4 is for a movie checkout where Org2 obtains an access license to ticket the movie to customers. The transaction t4 has input 1305, i.e., {Movie, Org1, Org2}, and output 1310, i.e., {Movie.owner=Org1, Movie.accesslicense.owner=Org2}, representing the second level watermarking which sets the access license owner to Org2. The input 1305 is signed by the application's organization Org1, and the output 1310 is signed by both organizations identified by the endorsement policy 1205 (i.e., Org1 and Org2). These signatures were generated by using each actor's private key, such that anyone in the network can verify that all actors in the network are in agreement about the transaction details. The signatures become part of the second level watermark embedded into the digital streaming media, which encrypts the media for secure transmission to the Dual 4k Laser XYZ Digital Movie Projector 415*a*, such that ABC Theaters can show (e.g., display) the artifact (e.g., the movie) to customers in its theaters.

A transaction that is distributed to all peer nodes in the network is validated in two phases. Firstly, the transaction is checked to ensure it has been signed by sufficient organizations according to the endorsement policy. Secondly, it is checked to ensure that the current value of the world state matches the read set of the transaction when it was signed by the endorsing peer nodes, i.e., that there has been no intermediate update. If a transaction passes both these tests, it is marked as valid. All transactions are added to the blockchain history, whether valid or invalid, but only valid transactions result in an update to the world state. The client application will use the public key/secret to decode the second level watermark from the digital media and at that point will be able to run the media on the viewer. Tying this example to the environment of FIG. 4, ABC Theaters is the movie consumer that is requesting check-out of a movie stored in the cloud object storage 436, and after undergoing the check-out process of FIG. 10 is able to play the checked-out movie on the Dual 4k Laser XYZ Digital Movie Projector 415*a*. In this example, t4 is a valid transaction, so the access license owner of movie has been set to Org2. However, in another example, t5 (the details of which are not shown) is an invalid transaction, so while it was recorded in the ledger, the world state was not updated.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computer device, an artifact and a first token with a check-in request;
applying, by the computer device, a first level fragile watermark to the artifact, wherein the first level fragile watermark includes ownership information from the first token;
receiving, by the computer device, a second token with a check-out request;
applying, by the computer device, a second level fragile watermark to a copy of the first level fragile watermarked artifact, thereby generating a second level fragile watermarked artifact, wherein the second level fragile watermark includes authentication information from the second token; and
transmitting, by the computer device, the second level fragile watermarked artifact to a client device,
wherein the applying the first level fragile watermark to the artifact comprises:
sending a call to a web service, wherein the call includes the artifact and the first token; and
receiving the first level fragile watermarked artifact from the web service in response to the call, and
wherein the applying the second level fragile watermark to the copy of the first level fragile watermarked artifact comprises:
sending a call to a smart contract in a blockchain network, wherein the call includes the second token; and
receiving the second level fragile watermarked artifact from the smart contract in response to the call,
wherein the second level fragile watermarked artifact comprises the authentication information as encrypted authentication information via the second level fragile watermark that restricts the second level fragile watermarked artifact to being viewed only if the client device has a credential that satisfies the encrypted authentication information.

2. The method of claim 1, wherein:
the artifact is digital media; and
the first level fragile watermark is imperceptible to a human user viewing the digital media.

3. The method of claim 1, wherein the smart contract records the check-out request in a blockchain transaction log.

4. The method of claim 1, wherein:
the second level fragile watermark permits the client device to display the second level fragile watermarked artifact when the client device has a credential that satisfies the authentication information in the second level fragile watermark; and
the second level fragile watermark prevents the client device from displaying the second level fragile watermarked artifact when the client device does not have a credential that satisfies the authentication information in the second level fragile watermark.

5. The method of claim 1, wherein the steps of claim 1 are performed by a blockchain application program interface system situated between the client device and a digital rights management blockchain network that logs the check-in request, logs the check-out request, and stores the first level fragile watermarked artifact.

6. The method of claim 5, wherein the first level fragile watermarked artifact remains in storage in the digital rights management blockchain network while the second level fragile watermarked artifact is transmitted to the client device, wherein:
the first token comprises a json web token (JWT) of a user performing the check-in request; and
the second token comprises a JWT of a user performing the check-out request.

7. The method of claim 5, further comprising:
attempting to decrypt the second level fragile watermarked artifact;
determining decryption to be successful if a public/secret key possessed by a client application satisfies encryption information in the second level fragile watermarked artifact; and
permitting the client device to display the second level fragile watermarked artifact in response to determining the decryption to be successful.

8. The method of claim 1, wherein the computer device includes software provided as a service in a cloud environment.

9. The method of claim 1, wherein:
the computer device comprises a node at an edge of a cloud computing environment;
the computer device receives the check-in request from a first client device; and
the computer device receives the check-out request from a second client device that is different than the first client device.

10. The method of claim 9, wherein the authentication information includes an encryption key that is based on data of the second token, such that the authentication information restricts the second level fragile watermarked artifact to being viewed only by a device that has a credential that satisfies the authentication information.

11. The method of claim 1, wherein sending the call to the web service comprises communicating with a server of the web service via network communication.

12. The method of claim 1, further comprising:
receiving a browse request;
sending a call to the blockchain network, wherein the call includes the browse request; and
receiving blockchain library catalog data from a second smart contract in the blockchain network in response to the call.

13. The method of claim 1, further comprising:
receiving a second artifact;
applying a digital wrapper to the second artifact to generate a digitally wrapped artifact, wherein the digital wrapper includes authentication information that must be satisfied by a client device attempting to view the digitally wrapped artifact;
receiving a third artifact; and
digitally signing the third artifact to generate a digitally signed artifact, wherein the digitally signed artifact is permitted to be displayed on the client device, but prevented from being captured by a digital camera when displayed on the client device.

14. The method of claim 1, wherein the artifact comprises digital streaming media,
further wherein the second level watermark comprises signatures generated using private keys by organizations identified by an endorsement policy for the smart contract that indicates which organizations in the blockchain network must sign a transaction generated by the smart contract for the transaction to be valid;
determining if the transaction is valid, wherein determining if the transaction is valid comprises checking to ensure the transaction has been signed by sufficient organizations according to the endorsement policy, and checking to ensure that a current value of a ledger world state matches a read set of the transaction when it was signed by endorsing peer nodes;
adding the transaction to a distributed ledger;
updating the ledger world state in response to determining that the transaction is valid;
making the signatures part of the second level watermark;
embedding the second level watermark into the digital streaming media; and
encrypting the digital streaming media for secure transmission to the client device.

15. A computer program product, the computer program product comprising one or more computer readable storage media having program instructions collectively stored on the one or more computer readable storage media, the program instructions executable to:
receive an artifact and a first token with a check-in request, wherein the artifact is digital media;
apply a first level fragile watermark to the artifact, wherein the first level fragile watermark includes ownership information from the first token, and the first level fragile watermark is imperceptible to a human user viewing the digital media, and wherein the applying the first level fragile watermark to the artifact comprises:
sending a call to a web service, wherein the call includes the artifact and the first token; and
receiving the first level fragile watermarked artifact from the web service in response to the call;
receive a second token with a check-out request;
apply a second level fragile watermark to a copy of the first level fragile watermarked artifact, thereby generating a second level fragile watermarked artifact, wherein the second level fragile watermark includes authentication information from the second token, wherein the applying the second level fragile watermark to the copy of the first level fragile watermarked artifact comprises:
sending a call to a smart contract in the digital rights management blockchain network, wherein the call includes the second token; and
receiving the second level fragile watermarked artifact from the smart contract in response to the call; and
transmit the second level fragile watermarked artifact to a client device, wherein the first level fragile watermarked artifact remains in storage in a digital rights management blockchain network while the second level fragile watermarked artifact is transmitted to the client device, wherein the second level fragile watermarked artifact comprises the authentication information as encrypted authentication information via the second level fragile watermark that restricts the second level fragile watermarked artifact to being viewed only if the client device has a credential that satisfies the encrypted authentication information.

16. The computer program product of claim 15, wherein the smart contract records the check-out request in a blockchain transaction log in the in the digital rights management blockchain network.

17. The computer program product of claim 16, wherein the second level fragile watermark prevents the client device from displaying the second level fragile watermarked artifact when the client device does not have a credential that satisfies the authentication information in the second level fragile watermark, wherein:

the first token comprises a json web token (JWT) of a user performing the check-in request; and the second token comprises a JWT of a user performing the check-out request.

18. A system comprising one or more computer readable storage media, and program instructions collectively stored on the one or more computer readable storage media, the program instructions comprising:

program instructions to receive an artifact and a first token with a check-in request, wherein the artifact is digital media;

program instructions to apply a first level fragile watermark to the artifact, wherein the first level fragile watermark includes ownership information from the first token, and the first level fragile watermark is imperceptible to a human user viewing the digital media, and wherein the applying the first level fragile watermark to the artifact comprises:

sending a call to a web service, wherein the call includes the artifact and the first token; and receiving the first level fragile watermarked artifact from the web service in response to the call;

program instructions to receive a second token with a check-out request;

program instructions to apply a second level fragile watermark to a copy of the first level fragile watermarked artifact, thereby generating a second level fragile watermarked artifact, wherein the second level fragile watermark includes authentication information from the second token, wherein the applying the second level fragile watermark to the copy of the first level fragile watermarked artifact comprises:

sending a call to a smart contract in the digital rights management blockchain network, wherein the call includes the second token; and receiving the second level fragile watermarked artifact from the smart contract in response to the call; and program instructions to transmit the second level fragile watermarked artifact to a client device, wherein the first level fragile watermarked artifact remains in storage in a digital rights management blockchain network while the second level fragile watermarked artifact is transmitted to the client device, wherein the second level fragile watermarked artifact comprises the authentication information as encrypted authentication information via the second level fragile watermark that restricts the second level fragile watermarked artifact to being viewed only if the client device has a credential that satisfies the encrypted authentication information.

19. The system of claim 18, wherein the smart contract records the check-out request in a blockchain transaction log in the in the digital rights management blockchain network, wherein the second level fragile watermark prevents the client device from displaying the second level fragile watermarked artifact when the client device does not have a credential that satisfies the authentication information in the second level fragile watermark.

* * * * *